United States Patent [19]

Stillman

[11] 4,100,052

[45] Jul. 11, 1978

[54] ELECTROLYTIC GENERATION OF HALOGEN BIOCIDES

[75] Inventor: Neil W. Stillman, Madison, Ohio

[73] Assignee: Diamond Shamrock Corporation, Cleveland, Ohio

[21] Appl. No.: 740,870

[22] Filed: Nov. 11, 1976

[51] Int. Cl.² ............... C25B 1/26; C25B 9/00; C02B 1/82

[52] U.S. Cl. .................. 204/268; 204/95; 204/149; 204/269; 204/275

[58] Field of Search ............ 204/94, 95, 98, 149, 204/152, 268, 275, 290 P, 269

[56] References Cited

U.S. PATENT DOCUMENTS

| | | | |
|---|---|---|---|
| 844,167 | 2/1907 | Muphy | 204/269 |
| 943,187 | 12/1909 | Hartman | 204/268 X |
| 1,026,857 | 5/1912 | Fixen | 204/268 |
| 2,864,750 | 12/1958 | Hughes, Jr. et al | 204/149 |
| 3,222,270 | 12/1965 | Edwards | 204/269 |
| 3,305,472 | 2/1967 | Oldershaw et al. | 204/268 |
| 3,632,498 | 1/1972 | Beer | 204/290 F |
| 3,766,045 | 10/1973 | Itakura et al. | 204/149 X |
| 3,835,020 | 9/1974 | Galneder | 204/149 X |
| 3,926,754 | 12/1975 | Lee | 204/152 |

FOREIGN PATENT DOCUMENTS 2,652,125   6/1977   Fed. Rep. of Germany.

Primary Examiner—Arthur C. Prescott
Attorney, Agent, or Firm—Bruce M. Winchell

[57] ABSTRACT

Disclosed is an electrolytic cell for the generation of low cost halogen biocidally active agent from an aqueous solution having a low halogen salt content for use in the treatment of sewage or other liquid affluents, especially those of fresh water swimming pools or fresh water cooling towers. The electrolytic cell is used in line with pumps generally associated with the distribution of waters for swimming pools or cooling towers.

12 Claims, 4 Drawing Figures

ELECTROLYTIC GENERATION OF HALOGEN BIOCIDES

BACKGROUND OF THE INVENTION

The present invention generally relates to an electrolytic cell for the generation of low cost halogen biocidally active agent for the treatment of a sewage or other liquid affluents especially those waters of a fresh water swimming pool or cooling towers. More particularly, the present disclosure relates to an improved electrolytic cell having a bipolar configuration which is used in line with the pumps generally associated with the distribution of waters in swimming polls or cooling towers or other liquid affluents for the generation of chlorine from affluent containing low levels of chloride. This employs an enclosure connected in line with the liquid distribution system of the facility containing a series of parallel planar plates to be utilized as electrodes arranged such that the affluent flows through the parallel planar matrix of plates and is treated thereby with the chlorine being electrolytic ally produced from within the confines of the electrolytic cell.

Chlorine has been used for some time as a biocidally active agent for use with sewage, liquid affluents, water in swimming pools or cooling tower waters, in addition to drinking water. In the past this has been done largely with chemical treatment of such waters with chemical compounds such as a hypochlorite compound. The addition of chemical compounds to affect the biocidal activity desired has become costly and it is likely that greater restrictions upon the traffic of dangerous chemical products in the transportation networks of the world will necessitate on site manufacture of such compounds or a different means by which treatment may be carried out. Electrochemical methods of manufacture present one solution to this problem due to their capability for small onsite production at a reasonable cost, greater ecological acceptability, and potential for energy conservation. Furthermore, electrochemical methods of manufacture can generally be operated as a closed system thereby allowing greater control over the escape of by-products or waste products from the electrolytic cells which may have been enviornmentally undesirable. Electrolytic cells promise to be one of the most efficient means of utilizing electricity which is likely to be used more in the future due to the rapidly rising price and expected exhaustion of fossil fuels such as coal, gas, and oil.

Where there are readily available supplies of salt water such as sea water, aqueous solutions of hypochlorite solution can be readily made by electrolysis of sea water. All too often through electrical generation facilities, swimming pools, or sewage treatment plants are located in areas where only fresh water is available. In these settings, electrolytic generation of low levels of chlorine has been hampered by low current efficiencies and the formation of scale upon the cathode. Therefore, those skilled in the art have turned to a system whereby much higher concentrations of a chloride solution are used to generate chlorine which is then admixed with the liquids for use in the biocidal treatment of the liquids. While current efficiencies are good in such units, the associated hardware for the admixing step of the procedure becomes increasingly expensive and thus lowers commercial realization of the full potential of electrolytic chlorine generation for such treatment purposes. Also such units have become increasingly complex and have thus far exhibited poor field experience in use.

Therefore it would be exceedingly advantageous to develop an electrolytic cell system for the generation of chlorine using a liquid electrolyte containing very low concentrations of halogen salt such that the device could be used in line with the pumping system of the facility.

SUMMARY OF THE INVENTION

It is therefore an object of the present invention to provide an electrolytic cell which can generate a halogen directly from a solution containing a very low halogen salt concentration so that the cell could be placed in line with the pumping system of the given facility.

It is another object of the present invention to provide an electrolytic cell which can be manufactured at a cost within the realm of commercial feasibility for use in the on site generation of halogen biocidally active agent on a small scale.

These and other objects of the present invention, together with the advantages thereof over existing and prior art forms which will become apparent to those skilled in the art from the detailed disclosure of the present invention as set forth hereinbelow, are accomplished by the improvements herein shown, described and claimed.

It has been found that an electrolytic cell for the production of halogen for use as biocidal agent can consist of: an enclosure; means for connecting the enclosure to a liquid distribution system of the facitity to be biocidally affected so that the liquid must flow therethrough; a plurality of spaced planar electrode plates attached to the enclosure interior in parallel fashion; each of the spaced planar electrode plates having coatings on one side thereof such that ionic potential travel is promoted in one direction; means for connecting a power source to substantially less than all of said spaced planar electrode plates to promote an electrical field across the spaced planar electrode plates to evolve halogen which is dissolved in the liquid flowing through the distribution system; and a halogen salt concentration in the liquid greater than 0.5 grams per liter.

It has also been found that a method for the production of halogen from a dilute halogen salt solution in an amount sufficient to produce a biocidally active agent for the treatment of a liquid can comprise the steps of: adding a sufficient amount of halogen salt to the liquid to produce a concentration thereof greater than 0.5 grams per liter; placing in line with the liquid distribution system, an electrolytic cell having a purality of spaced planar electrode plates arranged in parallel fashion with each of the spaced planar electrode plates having coatings on one side thereof such that an ionic potential is promoted in one direction by an electrical power source connected to substantially less than all of the spaced planar electrode plate; operating the electrolytic cell noncontinuously in accordance with a predetermined desired effective level of the biocidally active agent as electrolytically produced from the dilute halogen salt solution; and providing for the continued operation of the distribution system through the electrolytic cell when the electrolytic cell is not in operation for cleaning the spaced planar electrode plates.

The preferred embodiment of the subject electrolytic cell is shown by way of example in the accompanying drawings without attempting to show all of the various forms and modifications in which the invention might be embodied; the invention being measured by the appended claims, not by the details of this disclosure.

DESCRIPTION OF THE PREFERRED EMBODIMENT

Figure 1:
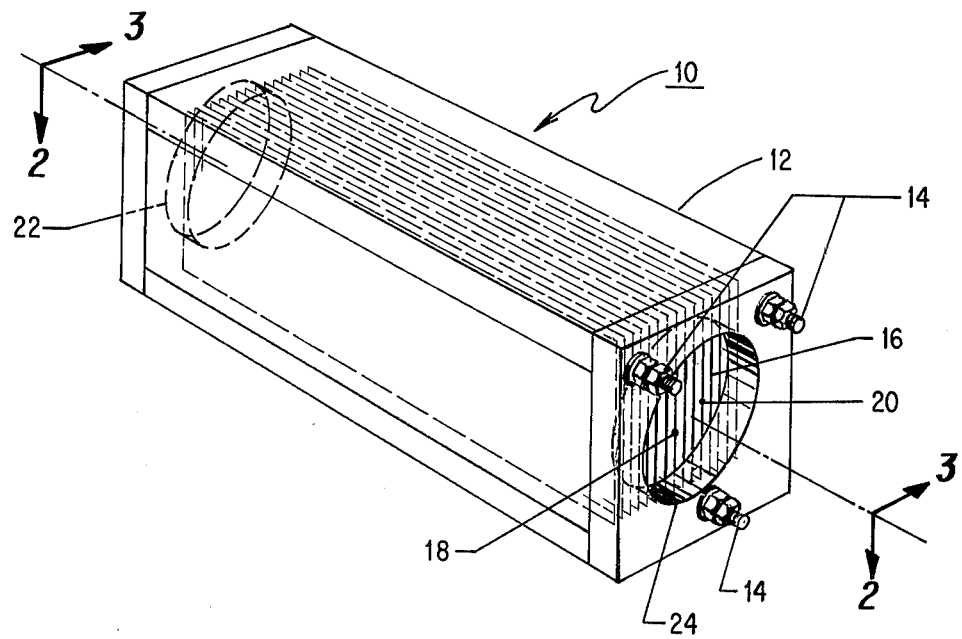
FIG. 1 is a perspective view of an electrolytic cell for generating a biocidal agent from a dilute solution of a halogen salt according to the concepts of the present invention.
Figure 2:
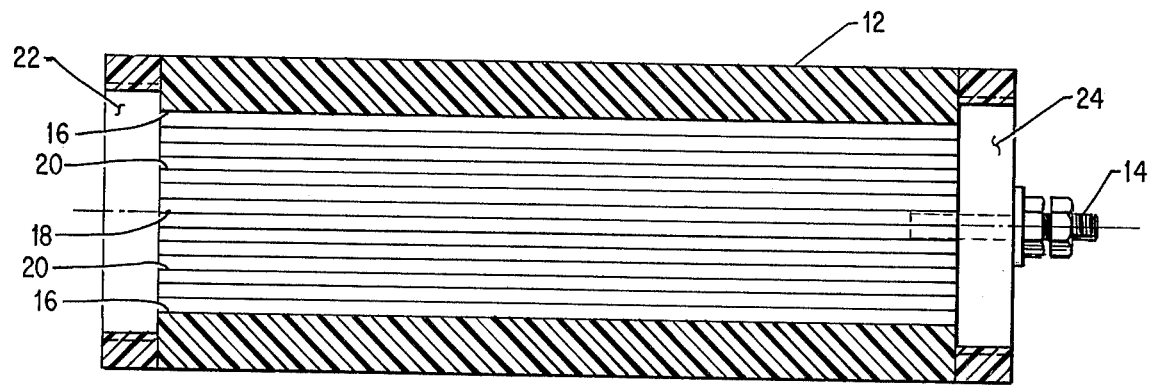
FIG. 2 is a side section view of the electrolytic cell taken substantially along line 2—2 of FIG. 1.
Figure 3:
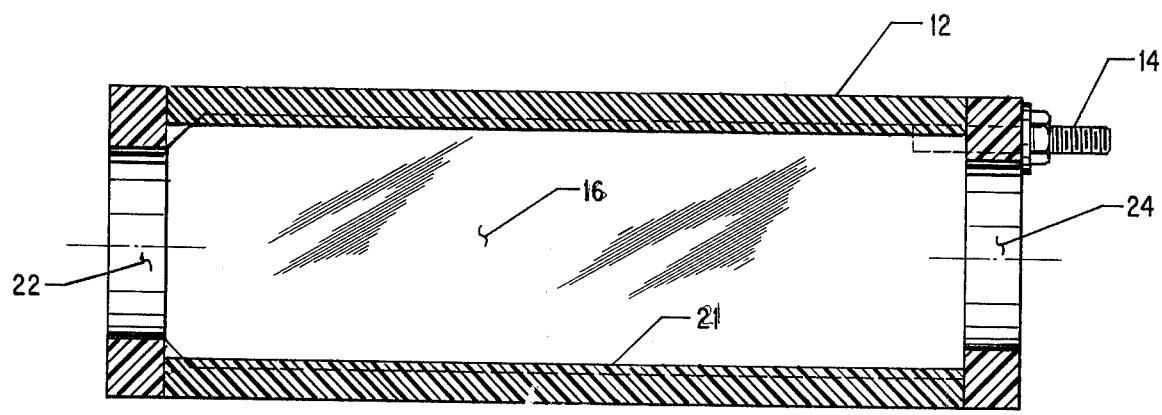
FIG. 3 is a side section view of the electrolytic cell taken substantially along line 3—3 of FIG. 1.

Referring to FIG. 1 of the drawings, numeral 10 refers to an electrolytic cell of a bipolar nature constructed according to the concepts of the present invention. The electrolytic cell 10 has a cell enclosure 12 which is generally made of a nonconducting or insulative material which is chemically resistant to the liquid to be used within the cell. Suitable examples of such materials would include polymethyl methacrylate, polyvinyl chloride, polypropylene and polyethylene. At one end of the cell enclosure 12 are current distributors 14 which conduct an electrical current from a power source exterior of the enclosure 12 to the electrode plates contained therein. For instance, two such current distributors might be connected from exterior of the cell enclosure 12 to the end electrode plates 16 while a thrid current distributor would be connected through the cell enclosure 12 to the center electrode plate 18. These current distributors would be attached to power source terminals of opposite polarity. As can be seen in FIGS. 2 and 3 the current distributors need only extend a short distance along the electrode plates 16 and 18.

It is believed that the polarity is not of great consequence as long as the central electrode plate 18 is of opposite polarity from the end electrode plates 16. Also those skilled in the art would realize the two end electrode plates could be of opposite polarity thus eliminating the central electrode plate.

As it can be seen in FIGS. 1, 2 and 3, center electrode plate 18 and end electrode plates 16 are planar in nature and are connected within the cell enclosure 12 in a spaced parallel arrangement along the axis of liquid flow through the electrolytic cell 10. Between the end electrode plates 16 and the center electrode plate 18 as seen in FIG. 2 are several bipolar electrode plates 20. The number of bipolar electrode plates 20 may range from one to 30 with 6 to 20 being preferred. These bipolar electrode plates 20 are also planar in nature and placed within the cell enclosure 12 in a spaced parallel arrangement. In this way the cell structure of the electrolytic cell 10 appears to be a column with an ingress 22 at one end and an egress 24 at the other end thereof. Ingress 22 and egress 24 are connected to the distribution system so that a liquid may pass through electrolytic cell 10 in a laminar flow between the spaced planar plates. The ingress 22 and egress 24 as seen in FIG. 3 extend nearly the entire height of the center electrode plate 18 to reduce to a minimum the areas of lower flow velocity within the cell 10. This feature enhances the cleaning action of the liquid flow through the cell 10 to remove any scale deposits.

Those skilled in the art will readily recognize that there are numerous ways for precisely aligning the purality of electrode plates 16, 18 and 20 within the cell enclosure 12 to provide a good electrolytic cell 10. One suitable way of accomplishing this is to cut in two sides of the cell enclosure 12, slots 21 approximately ⅛ inch (3.175 mm) deep of a width equal to that of the electrode plates 16, 18 and 20 such that the plates 16, 18 and 20 may be conveniently placed therein and the cell enclosure 12 closed to form electrolytic cell 10. In this way the electrode plates 16, 18 and 20 may be held tightly in place to insure uniform gaping therebetween as the liquid being used for an electrolyte passes between ingress 22 and egress 24.

It has been found that the electrode plates 16, 18 and 20 can be spaced approximately 0.025 to 0.5 inch (0.635 to 12.7 mm) apart with a preferred spacing of approximately 0.075 inches (1.9 mm). If the gap is made too small the resistance to flow of the electrolyte through the cell would increase to such an extent as to limit the electrolyte capacity of the electrolytic cell 10 thus limiting its capacity to produce halogen biocidal agent.

Each electrolytic cell 10, out of necessity, contains an anode, cathode and a number of bipolar electrode element plates 20. A bipolar electrode plate is an electrode plate that has an anodically active coating on one side thereof such that the bipolar elecrode plate functions as a cathode on one side and an anode on the other side to transmit an ionic potential thereacross in one direction only. The bipolar electrode plates 20 can be made from a substrate material which may include any conventional electrical conductive electrocatalytically active material resistant to the electrolyte such as a valve metal like: aluminum, hafnium, molybdenum, niobium, tantalum, titaniun, tungsten, vanadium, zirconium and alloys thereof. A preferred valve metal based upon cost availability, electrical and chemical properties is titanium. The substrate materials selected for use as a bipolar electrode plate 20 would bear on the surface thereof a noble metal, a noble metal oxide either alone or in connection with a valve metal oxide, or other electrocatalytically active corrosion resistant materials. Suitable coatings would be those disclosed in U.S. Pat. Nos. 3,632,498 and 3,711,385 hereby incorporated by reference. These coatings would be applied to one side only of each of the bipolar electrode plates 20 to promote ionic potential travel in one direction and to enhance the bipolar configuration of electrolytic cell 10. A bipolar configuration as hereinafter referred to is defined as an electrolytic cell wherein electrical power is applied to substantially less than all of the electrode plates present in the cell, and those electrode plates not directly connected to the electrical power source act as an anode on one side and a cathode on the other side so as to pass an ionic potential through the structural member in one direction.

The bipolar electrode plates 20 must be thick enough to maintain their integrity throughout the life of the cell without being unduly burdensome. Suitable thicknesses would be in the range of 0.02 to 0.06 inch (0.508 to 1.524 mm). Electrodes of this type are commonly referred to as dimensionally stable anodes and are well known and widely used in the industry. See for example U.S. Pat. No. 3,917,518 hereby incorporated by reference. The bipolar electrode plates 20 would all generally be made in a fashion according to the foregoing description and additionally either the center electrode plate 18 or end electrodes plates 16 would also be made according to the aforegoing discussion. It has been found that the electrode plates 16, 18 and 20 can be arranged in several ways. In one arrangement central electrode plate 18 is a double coated anode and the end electrode plates 16 serve as cathodes. In this arrangement the bipolar electrode plates 20 are arranged so that the coated surfaces face the cathode end electrode plates 16 on each side of the electrolytic cell 10. In another arrangement the central electrode plate 18 is a cathode and the end electrode plate 16 are anodes with a surface coating on one side therof. The bipolar electrode plates 20 are then placed between the center electrode plate 18 and end electrode plates 16 with the coated surface facing the cathode center electrode plate 18. In this fashion the electrical power source need only be connected to the center electrode plate 18 and the end electrode plates 16 to create an electrical field therebetween. The bipolar electrode plates 20 are then ionically charged so as to function in a bipolar configuration to promote transmission of an ionic potential.

In addition to the aodes necessary for the cell the cathodes will generally be constructed from any conventional electrically conductive material resistant to the electrolyte such as iron, mild steel, stainless steel, nickel, stainless steel clad copper, or nickel plate copper. As with the anodes, the thickness of the sheets used for the cathode plates should generally be within the same range. The electrolytic cell 10 and especially the area of the electrode plates 16, 18 and 20 are sized according to the halogen biocidal active agent capacity necessary for the desired purpose. This will be generally in the range of 180 to 220 square inches of anode surface area for small onsite use.

Figure 4:
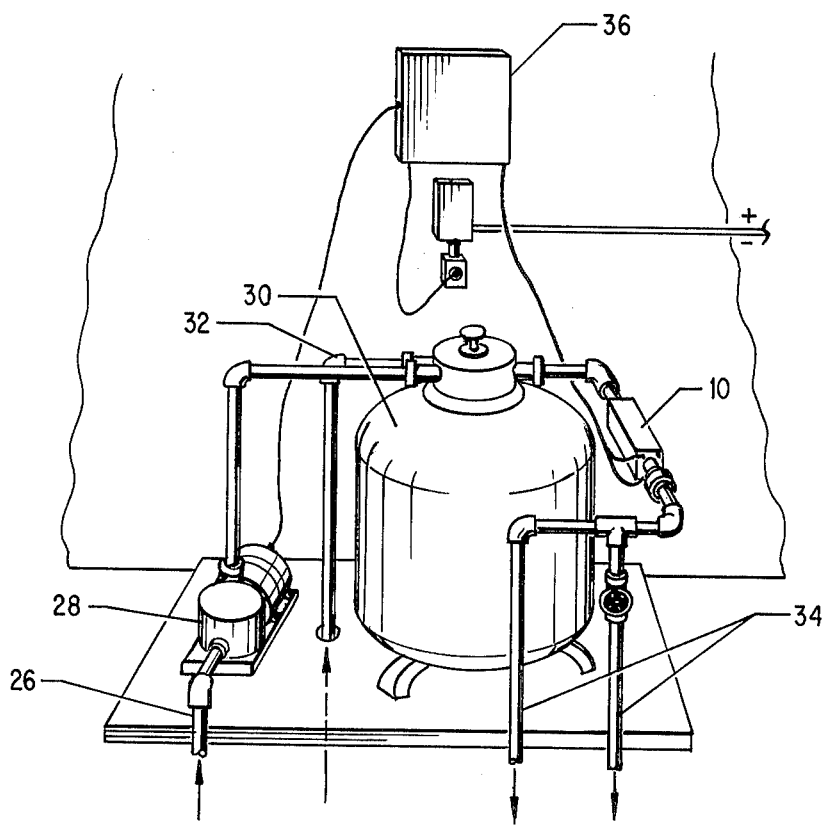
FIG. 4 is a diagrammatic view showing the environmental structure which might be associated with such an electrolytic cell for use in chlorinating a swimming pool.

FIG. 4 is diagrammatic representation of a typical swimming pool liquid distribution system with an electrolytic cell 10 according to the concepts of the present invention incorporated therein for the production of halogen biocidal agent necessary for the pool. Liquid distribution system as hereinafter referred to is defined to include any transport of any portion or the whole of the liquid to be treated including: a swimming pool recirculation system; a liquid intake for coolants for large electrical generating facilities and circulation systems associated with sewage treatment facilities. The present demand for such biocidal agents in swimming pools is for chlorine because its biocidal activity but such an electrolytic cell 10 according to the concepts of the present invention could just as easily produce other halogens, such as iodine, which are also biocidally active agents. As seen in FIG. 4 there is an outlet line 22 from the swimming pool which may be connected to a pump 28 and into a filtering tank 30 where particles may be expelled through a backwash line 32 and the water returned to the pool by feedlines 34. The electrolytic cell 10 can be suitably connected after the filtering tank 30 in the feedlines 24 going to the pool. A control system 36 may be used to control the pump 28 and the operation of the electrolytic cell 10 according to the needs of the swimming pool being maintained. The dimensions of a suitable electrolytic cell 10 for the use of producing a sufficient amount of biocidal agent for swimming pools up to approximately 20,000 gallons (75,708 1) would be about one and a quarter inches (31.75 mm) by three inches (76.2 mm) by six inches (152.4 mm) and have a total anode area of about 215 square inches (1387 sq. cm).

In this particular use for the chlorination of the swimming pool, a suitable means of controlling the electrolytic cell 10 and pump 28 would be the use of a timing system. A suitable control system 36 would have a 24 hour timer to operate the pool pump 28 and a 15 minute timer to operate the electrolytic cell 10. The electrolytic cell 10 is supplied with direct current through a rectifier at a low voltage and current density. This low voltage reduces the possibility of stray current leakage into the electrolyte stream which provides for safe operation of the system. This overcomes two basic problems of chemical addition, mainly the levelling effect, and the concentration gradient. Upon addition of chemicals the halogen concentration is high and subsequent to the addition of the pool chemicals the concentration falls off producing a levelling effect. Also since the pool chemicals are placed in a small relative area of the pool, a concentration gradient occurs such that there are spots of high concentration and spots of low concentration within the pool. The electrolytic cell 10 of the present invention maintains a more even concentration of halogen because the addition is affected over a longer period of time. Also by introducing the halogen into the distribution system instead of in stagnate liquid, the concentration level is much more even thus reducing the concentration gradient.

This results in less eye irritation to swimmers using such waters and also contributes to the clarity of the water which is greatly improved. The chemicals being added to swimming pools usually contain inert elements which are not totally soluble in the waters thus causing a clouding of the swimming pool waters versus the electrolytic cell 10 of the present invention which produces a pure halogen which is instantly dissolved through the distribution system.

The electrolytic cell 10 may be operated over a range of 10 to 50 volts with a preferred range of about 20 to 30 volts. The cells should be operated noncontinuously so as to prevent accumulation of scale deposits on the cathode surfaces. Between the periods of activity of the electrolytic cell 10 the electrode plates 16, 18 and 20 are washed by the liquid flowing through the distribution system. For instance, after the cell 10 has been in use about one to thirty minutes, the power is shutoff but the pump 28 is continued so that an electrolyte will be pumped through electrolytic cell for an additional one to sixty minutes in order to clean the electrode plate surfaces 16, 18 and 20. This cycle can be repeated throughout the day for as long as desired. It is believed also that shorter cycles would be permissible to maintain a halogen content within the required levels for the biocidal activity required.

Furthermore, once a time control system has been established for a given pool, the pool will be chlorinated automatically and thereafter require very little human attention. If it is found that the chlorine content is getting out of balance, the time control system allows the flexibility of adjusting this with very little delay and maintaining a very even concentration over a longer period of time then would be generally possible with the addition of chemicals directly to the pool waters.

The electrolyte flow will be generally in the range of 20 to 70 gallons per minute (75.7 to 265 1 per min) between the anodic and cathodic surfaces. Flow rates in this range help prevent the deposits of scale on the cathode surfaces and reduces the possibility of current leakage. The flowrate through the electrolytic cell 10 will generally be greater than 2 feet per second (609.6 mm per sec).

One feature of the present invention is that the electrolytic cell 10 can function with a very low concentration of halogen salt in the system. The concentration recommended for use with this cell ranges between 0.5 and 5 grams per liter. Generally, as in current use for the production of chlorine this will amount to a sodium chloride concentration in the range of 0.5 to 5 grams per liter although it is contemplated that other halogen salts might be used to produce different halogens for improved results. The preferred halogen salt concentration is within the range of 1 to 3 grams per liter.

In order that those skilled in the art may more readily understand the present invention and certain preferred aspects by which it may be practiced, the following specific examples are afforded.

EXAMPLE 1

Two cells were made from acrylic sheet. Cell No. 1 contained 198 sq. in. (1277.4 sq.cm) of coated anodes according to U.S. Pat. Nos. 3,632,498 and 3,711,385 hereby incorporated by reference in a singular bipolar arrangement. Cell No. 2 contained 182 sq. in. (1174 sq.cm) of coated anodes according to the above noted U.S. Pat. Nos. in a double bipolar arrangement. Stainless steel (316) was used as cathodes in both cells. Tables I and II give the results that were obtained from static tests and recirculating tests, respectively. A 15 liter storage container was used for the recirculating tests.

TABLE I

| Cell | NaCl Concentration (g/l) | Volume, liter | Volts | Amperes | Time | Current Efficiency |
|---|---|---|---|---|---|---|
| 1 | 1.0 | 0.8 | 50 | 1.6 | 5 min. | 63% |
| 2 | 1.0 | 0.8 | 25 | 3.6 | 5 min. | 56% |
| 1 | 2.0 | 0.8 | 50 | 3.0 | 1 min. | 71% |
| 2 | 2.0 | 0.8 | 20 | 3.1 | 1 min. | 48% |

TABLE II

| Cell | NaCl Concentration g/l | Volts | Amperes | Time | Current Efficiency |
|---|---|---|---|---|---|
| 1 | 1.0 | 50 | 1.7 | 5 min. | 51% |
|   | 1.0 | 50 | 1.7 | 10 min. | 51% |
|   | 1.0 | 50 | 1.7 | 15 min. | 46% |
|   | 1.0 | 50 | 1.7 | 20 min. | 43% |
| 1 | 1.5 | 50 | 2.4 | 5 min | 65% |
|   | 1.5 | 50 | 2.4 | 10 min. | 57% |
|   | 1.5 | 50 | 2.4 | 15 min. | 53% |
|   | 1.5 | 50 | 2.4 | 20 min. | 49% |
| 1 | 2.0 | 50 | 3.2 | 5 min. | 66% |
|   | 2.0 | 50 | 3.2 | 10 min. | 58% |
|   | 2.0 | 50 | 3.2 | 15 min. | 55% |
|   | 2.0 | 50 | 3.2 | 20 min. | 52% |
| 2 | 1.0 | 25 | 2.8 | 5 min. | 55% |
|   | 1.0 | 25 | 2.8 | 10 min. | 47% |
|   | 1.0 | 25 | 2.8 | 15 min. | 44% |
|   | 1.0 | 25 | 2.8 | 20 min. | 41% |

EXAMPLE 2

Water in a swimming pool of 12,000 gallons capacity was treated to adjust the concentration of NaCl and residual chlorine to 1.11 gram/liter and 3.48 ppm, respectively. An electrolytic cell 10 containing an anode center electrode plate 18, five bipolar electrode plates 20 and a cathode end electrode plate 16 on each side to yield an anode area of 200 square inches (1290 sq. cm) was connected to a rectifier capable of delivering six amperes at 25 volts. A pump capable of delivering 50 gallons per minute (189 1per min) was installed on the chlorinator. The chlorinator was placed in continuous operation; the results are given in Table III.

TABLE III

| Day | Chlorine Concentration (ppm) | | Remarks |
|---|---|---|---|
|   | Pool | Cell |   |
| 0 | 3.48 | 3.64 |   |
| 1 | 0.80 | 1.75 | 23 volts, 3.25 amps |
| 5 | 1.20 | 1.84 | Current efficiency = 28.2% |
| 6 | 0.40 | 0.92 |   |
| 7 | 0.20 | 0.70 |   |
| 8 | <0.10 |   | Hot weather caused a decline in the residual chlorine. Dry chlorine was added to the pool. |
| 11 | 0.36 | 0.70 | 3.25 amps NaCl concentration = 1.06 g/l |

EXAMPLE 3

An electrolytic cell 10, containing a common cathode center electrode plate 18, and five bipolar electrode plates 20 and an anode end electrode plate 16 on each side, was installed as described in Example 1. In addition, a 15 minute timer, set for a "12 minutes on and 3 minutes off" electrolysis cycle and a 24 hour timer, set for a "12 hours on and 12 hours off" chlorinator cycle, were installed. Table IV gives the results that were obtained. It will be noticed that noncontinuous operation of the cell 10 improves the results markedly.

TABLE IV

| Day | Chlorine Concentration (ppm) | | Remarks |
|---|---|---|---|
|   | Pool | Cell |   |
| 0 | — | — | NaCl concentration = 1.72 g/l |
| 1 | 2.7 | 4.2 | Amperage on cell = 4.5 |
| 6 | — | — | Timer reset: 8 hrs. on 16 hrs. off NaCl concentration = 1.68 g/l |
| 13 | 2.3 | 3.4 | Current efficiency = 55% to 60% Amperage on cell = 2.5 NaCl concentration = 1.48 g/l |
| 16 | 1.3 | 2.0 | Amperage on cell = 2.5 |
| 19 | 1.6 | 3.2 | Amperage on cell = 2.5 |
| 23 | 2.1 | 3.2 |   |
| 26 | 1.4 | 2.5 |   |

EXAMPLE 4

An electrolysis cell 10 was installed on swimming pools of various sizes as described in Example 2, except that the timer was set according to the following Table V showing the results over a 12 week time period. The numerical values are averages of data collected for the stipulated week of operation.

TABLE V

|   | 1st week | 3rd week | 6th week | 8th week | 12th week |
|---|---|---|---|---|---|
| 11,000 gallon pool | | | | | |
| Minutes on/Minutes off | 7.5/7.5 | 7.5/7.5 | 7.5/7.5 | 7.5/7.5 | 7.5/7.5 |
| Hours of operation/day | 8 | 8 | 8 | 8 | 8 |
| Voltage | 26.0 | 26.0 | 24.0 | 20.5 | 22.5 |
| Amperage | 4.0 | 4.0 | 3.0 | 3.5 | 4.0 |
| Cl in ppm | 2.0 | 2.0 | 1.8 | 1.6 | 2.0 |

TABLE V-continued

| | 1st week | 3rd week | 6th week | 8th week | 12th week |
|---|---|---|---|---|---|
| 12,000 gallon pool | | | | | |
| Minutes on/Minutes off | 5/10 | 5/10 | 5/10 | 5/10 | 6/9 |
| Hours of operation/day | 12 | 12 | 12 | 12 | 12 |
| Voltage | 22.5 | 24.5 | 25.0 | 26.0 | 27.0 |
| Amperage | 5.0 | 5.0 | 4.0 | 3.5 | 3.5 |
| Cl in ppm | 1.0 | 1.6 | 1.6 | 1.6 | 1.0 |
| 15,500 gallon pool | | | | | |
| Minutes on/Minutes off | 5/10 | 5/10 | 6/9 | 7/8 | 7/8 |
| Hours of operation/day | 10 | 10 | 10 | 10 | 10 |
| Voltage | 26.5 | 30.0 | 30.0 | 23.0 | 26.5 |
| Amperage | 3.0 | 3.0 | 2.5 | 4.0 | 2.75 |
| Cl in ppm | 2.0 | 1.6 | 2.0 | 1.6 | 2.0 |
| 18,000 gallon pool | | | | | |
| Minutes on/Minutes off | 7.5/7.5 | 7.5/7.5 | 7.5/7.5 | 7.5/7.5 | 7.5/7.5 |
| Hours of operation/day | 12 | 12 | 12 | 12 | 12 |
| Voltage | 25.0 | 24.0 | 22.5 | 22.0 | 23.0 |
| Amperage | 3.25 | 3.0 | 2.25 | 3.0 | 2.5 |
| Cl in ppm | 1.6 | 2.0 | 2.0 | 1.6 | 2.0 |

It is contemplated that the electrolytic cell 10 in addition to its use for swimming pools could just as easily be used for halogen biocidal agent generation necessary for sewage treatment or cooling tower waters as is generally associated with nuclear power plants in the fresh water areas. Such cells can be easily sized to the quantity requirements of the various facilities so that a very safe onsite generation of halogen biocidal agent can be effected. This then eliminates the need for the transportation of raw chemicals which might pose a hazardous situation. With such a low halogen salt concentration necessary for the production of halogen biocidal agent, the use of an electrolytic cell 10 readily facilitates an addition of an onsite halogen biocidal agent to the liquid to be treated.

Thus it should be apparent from the foregoing description of the preferred embodiment that the subject electrolytic cell 10 as herein shown and described accomplished the objects of the invention and solved the problems attended to the treatment of liquids with halogen biocidal agents.

What is claimed is:

1. An electrolytic cell for the production of halogen for use as a biocidal agent comprising: an enclosure; means for connecting said enclosure to a liquid distribution system of the facility to be biocidally affected so that the liquid must flow therethrough; a plurality of spaced planar electrode plates attached to said enclosure interior in parallel fashion across the entire cross-section area of said means for connecting said enclosure to a liquid distribution system; each of said spaced planar electrode plates having coatings on one side thereof to promote ionic potential travel in one direction through each of said spaced planar electrode plates; said means for connecting said enclosure to said liquid distribution system consisting of openings at opposing ends of said enclosure of a size nearly as large as the height of said spaced planar electrode plates; means for connecting a power source to substantially less than all of said spaced planar electrode plates to promote an electrical field thereacross to evolve halogen which is dissolved in the liquid flowing through said distribution system; and a halogen salt concentration in the liquid greater than 0.5 grams per liter.

2. An electrolytic cell according to claim 1 wherein said enclosure is made of an electrically nonconducting material.

3. An electrolytic cell according to claim 1 wherein said plurality of spaced planar electrode plates consists of two end electrode plates, a center electrode plate, and one to 30 bipolar electrode plates.

4. An electrolytic cell according to claim 3 wherein said bipolar electrode plates number in the preferred range of six to 20.

5. An electrolytic cell according to claim 4 wherein said means for connecting a power source is connected to said end electrode plates and said center electrode plate.

6. An electrolytic cell according to claim 5 wherein said bipolar electrode plates have a surface coating of an electrocatalytically active corrosion resistant material and said coated side of said bipolar electrode plates face the cathode.

7. An electrolytic cell according to claim 1 wherein said spaced planar electrode plates have a thickness in the range of 0.02 to 0.06 inch (0.508 to 1.524 mm).

8. An electrolytic cell according to claim 1 wherein the spacing between said spaced planar electrode plates is in the range of 0.025 to 0.5 inch (0.635 to 12.7 mm).

9. An electrolytic cell according to claim 8 wherein the spacing between said spaced planar electrode plates is 0.075 inch (1.9 mm).

10. An electrolytic cell according to claim 1 wherein said halogen salt concentration is within the preferred range of 1 to 3 grams per liter.

11. An electrolytic cell according to claim 1 wherein said plurality of planar electrode plates are held in place by a plurality of slots $\frac{1}{8}$ inch (3.175 mm) deep and a width equal to the thickness of said planar electrode plates in two sides of said enclosure.

12. An electrolytic cell according to claim 1 wherein said spaced planar electrode plates have a total anode area in the range of 180 to 220 square inches (1161 to 1419 sq. cm.).

* * * * *